United States Patent
Goodwin et al.

[11] Patent Number: 5,265,273
[45] Date of Patent: Nov. 23, 1993

[54] EMI SHIELD FOR A DISPLAY

[75] Inventors: Thomas A. Goodwin, Coral Springs; John F. Murray, Sunrise; Don S. Dunbar, Fort Lauderdale, all of Fla.

[73] Assignee: Motorola, Inc., Schaumburg, Ill.

[21] Appl. No.: 939,024

[22] Filed: Sep. 1, 1992

Related U.S. Application Data

[63] Continuation of Ser. No. 487,473, Mar. 2, 1990, abandoned.

[51] Int. Cl.⁵ ............................................... H04B 1/08
[52] U.S. Cl. ..................................... 455/347; 455/90; 455/301
[58] Field of Search ............... 455/89, 90, 95, 128, 455/300, 301, 347; 358/247, 252; 361/212, 220, 424

[56] References Cited

U.S. PATENT DOCUMENTS

| | | | |
|---|---|---|---|
| 4,379,635 | 4/1983 | McColl | 356/387 |
| 4,412,255 | 10/1983 | Kuhlman et al. | 358/252 |
| 4,559,579 | 12/1985 | Val | 361/212 |
| 4,628,365 | 12/1986 | Carlton | 358/253 |
| 4,631,214 | 12/1986 | Hasegawa | 315/85 |
| 4,642,727 | 2/1987 | Dalal | 361/212 |
| 4,717,989 | 1/1988 | De Barros et al. | 361/424 |
| 4,717,990 | 1/1988 | Tugcu | 361/424 |
| 4,779,025 | 2/1987 | Paynton et al. | 313/478 |
| 4,845,402 | 7/1989 | Smith | 358/247 |
| 4,910,090 | 3/1990 | Kuhlman et al. | 358/247 |
| 4,977,035 | 12/1990 | Travis et al. | 428/307.7 |
| 5,063,474 | 11/1991 | Igarashi | 361/212 |

OTHER PUBLICATIONS

Ferrex 110-0409-0115 Manufactured by Chomerics Discloses a Knitted Wire Mesh Laminated Between Glass or Plastic Substrates.
EMC Shielding Tape Manufactured by Tecknit Discloses a Screen for Shielding Purposes (1988), p. 11.
Surface Shield Manufactured by Dontech Inc. Discloses a Mesh Embedded Within a Surface-Technical Bulletin 1010, p. 2.

Primary Examiner—Reinhard J. Eisenzopf
Assistant Examiner—Edward Urban
Attorney, Agent, or Firm—Juliana Agon

[57] ABSTRACT

A process for fabricating an electromagnetic shield for a display provides for a sheet upon which a metal mesh pattern and a border surrounding the metal mesh pattern is photo-chemically etched on the sheet. In addition, a portable radio having an electromagnetic shielded display provides for a bordered metal mesh disposed between a cover and a display.

7 Claims, 2 Drawing Sheets

EMI SHIELD FOR A DISPLAY

This is a continuation of application Ser. No. 07/487,473, filed Mar. 2, 1990 and now abandoned.

BACKGROUND OF THE INVENTION:

This invention relates to an electromagnetic shield, and in particular to an electromagnetic shield for a display in a portable communication device.

The trend in portable radio design has been to use a microprocessor to control the functions of the radio. As the features expand, a memory external to the microprocessor may be required. However, the limited space available in a small portable radio may require that the radio, the microprocessor and the external memory be in close proximity to the display of the radio, resulting in increased electromagnetic shielding problems. In particular, the increased emissions from the microprocessor interfacing with the memory may radiate through the display and re-radiate back into the radio to interfere with normal radio operation. Therefore, a need exists to shield the display from electromagnetic interferences while allowing for an unobstructed view of the display.

BRIEF SUMMARY OF THE INVENTION

Accordingly, it is an object of the present invention to provide a process for fabricating an electromagnetic shield for a display.

Briefly, according to the invention, a sheet is provided upon which a metal mesh pattern and a border surrounding the metal mesh pattern is photo-chemically etched on the sheet.

In addition, a portable radio having an electromagnetic shielded display is provided such that a bordered metal mesh is disposed between a cover and a display.

DESCRIPTION OF THE PREFERRED EMBODIMENT

Figure 1:
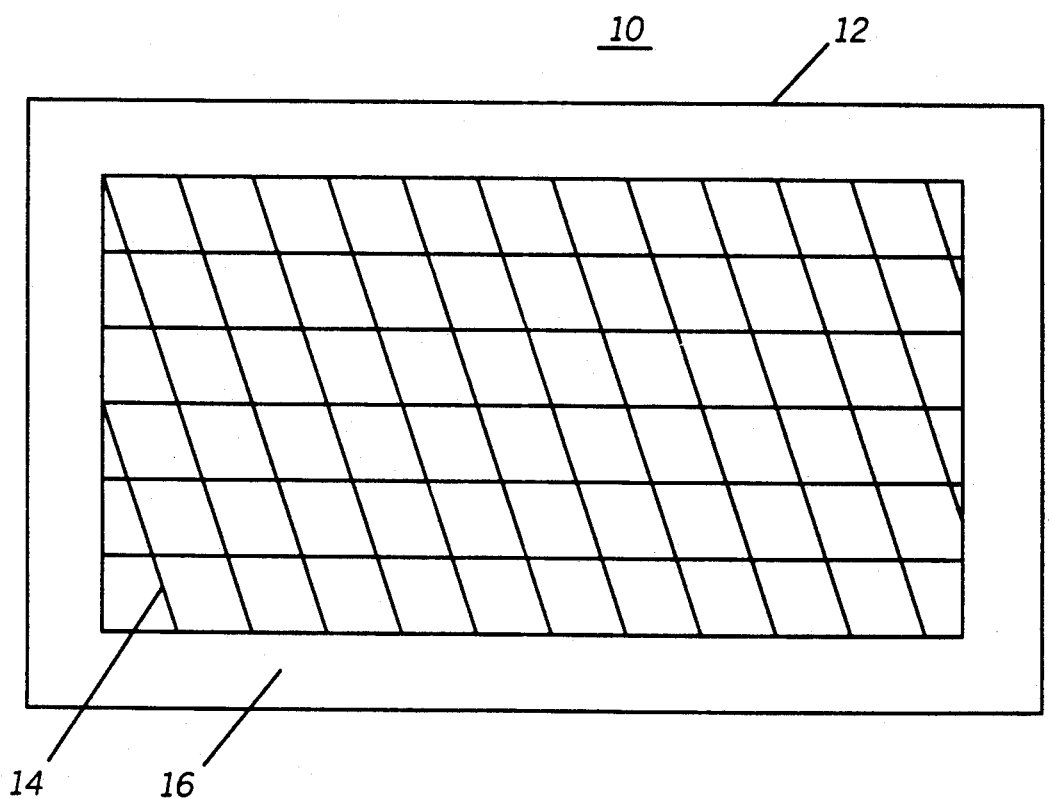
FIG. 1 is a top plan view of an electromagnetic shield in accordance with the present invention.

Referring now by characters of reference to the drawings and first to FIG. 1, an electromagnet shield for a display 1 0 in accordance with the present invention is illustrated. A thin sheet 12 of approximately 0.0015" thickness is fabricated preferably from a metal such as stainless steel. The metal of the sheet 12 is photo-chemically etched away to form a metal mesh pattern 14 as a single solid piece, preferably having approximately 0.002" wide lines and a border 16 surrounding the metal mesh pattern. For better visibility of the display through the electromagnetic shield 10, the metal mesh pattern 14 may be optionally black chrome plated to reduce glare. Furthermore, the mesh pattern 14 may be angled at a diagonal or slanted at a preferred fifteen degree angle relative to the display as shown or it may be orthogonal at ninety degrees.

The sheet 12 originally provided need not be metal. A transparent sheet made from a plastic material such as mylar can be a used for the sheet 12. A metal such as gold or copper or an alloy such as nickel copper or nickel copper manganese can be deposited over the transparent sheet 12 which has already been applied with adhesives. The sheet 12 is then laminated with the metal along with the adhesive in between. As before, the metal is photo-chemically etched away to form the mesh pattern 14 while leaving the border 16 around a metal mesh pattern 14 intact.

The materials chosen were selected because their properties of conduction and permeability make them the most effective shield for the frequencies involved. Some of the other factors considered or need to be considered for other choices are thickness, environmental performance, manufacturability, ease of assembly, and galvanic properties of the material.

Figure 2:
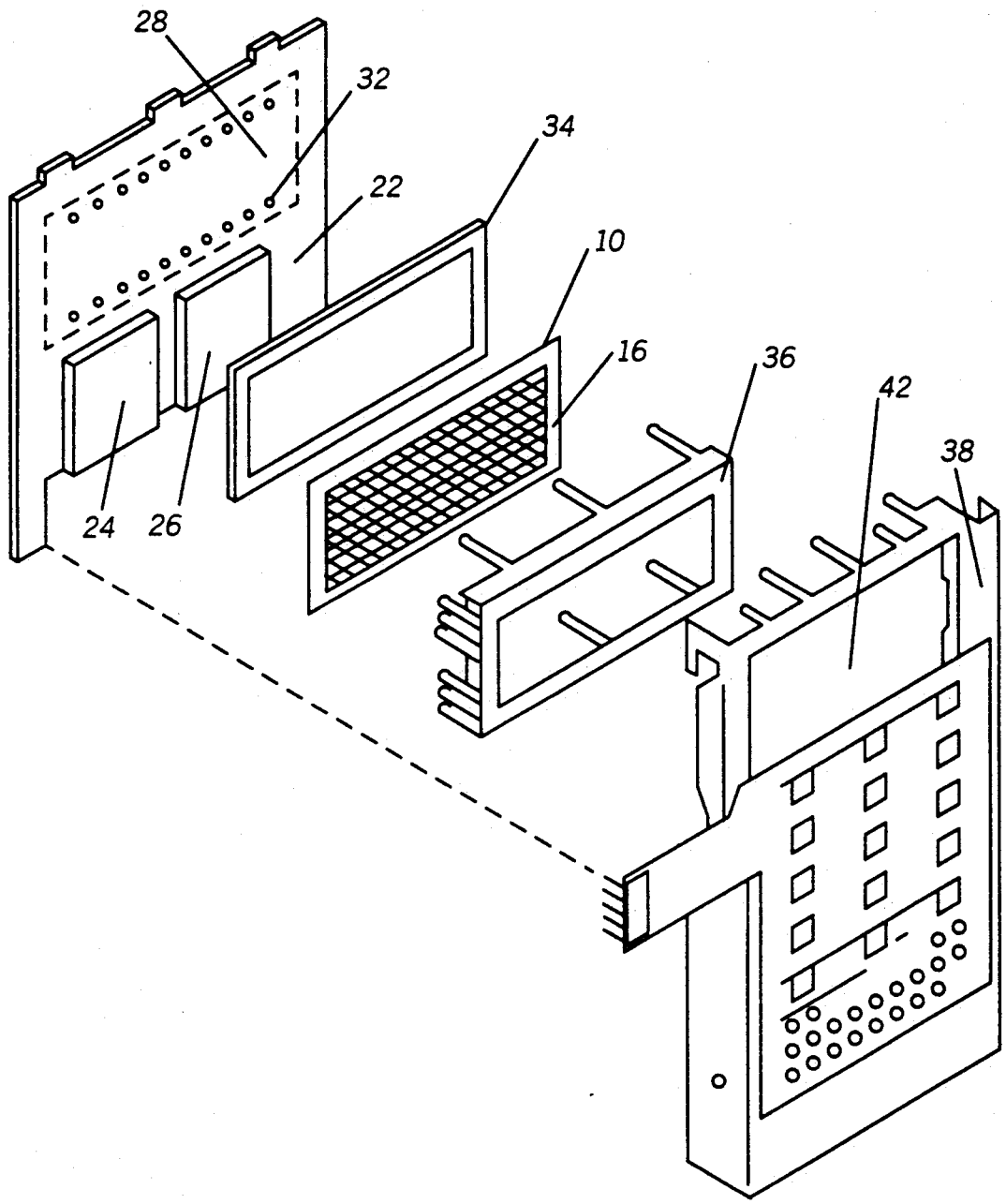
FIG. 2 is a an exploded side perspective view of the electromagnetic shield of FIG. 1 in a radio display.

Referring to FIG. 2 the assembly of the electromagnetic shield 10 of FIG. 1 is illustrated in a display of a communication device such as a portable radio in accordance with the present invention. For simplicity, only the pertinent parts are shown in this display assembly. A printed circuit board 22 having at least a microprocessor 24, and an optional external memory 26 being located below a rectangular area 28 having contacts 32 for a display 34 is illustrated. As is known in the art, the display 34 may be a liquid crystal display (LCD), an electroluminescent (EL) panel or any other types of display. During assembly, the display 34 is placed over the area 28 of the printed circuit board 22 and the bordered metal mesh or electromagnetic shield 1 0 of FIG. 1 is placed over the display 34. The exposed border of the electromagnetic shield 1 0 makes contact to a bezel 36, which includes an conductive surface to ground to a radio front assembly 38. For better conduction to the bezel 36, the border may be tin plated. The radio front assembly 38 has a transparent cover 42 which fits over the display 34.

As a result the bordered metal mesh 10 is disposed between the cover 42 and the display 34 for effective shielding and viewing of the display 34. The photo-chemically etched mesh formed as a single solid piece of mesh provides better conductivity than conventional interwoven screens which provide less conductivity from their surface contacts. Hence, the narrow mesh thus formed do not prevent reading of the display while creating a better shield.

We claim:

1. A portable radio having an electromagnetic shielded display, comprising:
    a microprocessor for controlling radio operation;
    a liquid crystal for the portable radio, said display disposed in front of said microprocessor;
    a radio front assembly having a transparent cover over said liquid crystal display;
    a single thin bordered metal mesh comprising an electromagnetic shield disposed between said cover and said liquid crystal display, said mesh having a plurality of apertures and a conductive border to provide improved conductivity for reducing electromagnetic emissions of said microprocessor from radiating through the display and re-radiating back into the radio to interfere with normal radio operation; and
    a bezel positioned between said electromagnetic shield and said radio front assembly for contacting the conductive border of the electromagnetic shield to properly ground both the electromagnetic shield and the radio front assembly.

2. The portable radio of claim 1 wherein said portable radio further comprises a printed circuit board carrying said microprocessor and a plurality of contacts for the liquid crystal display.

3. The portable radio of claim 2 wherein said electromagnetic shield, embodying a single bordered sheet having a high conductivity metallic wherein said electromagnetic shield is a stand-alone metal screen or a sheet of plastic material having a metallized mesh deposited and laminated on top of the sheet of plastic material, for protecting the radio against electromagnetic interferences from the microprocessor.

4. The portable radio of claim 3 wherein said metal screen comprises a single stainless steel apertured sheet having a plurality of apertures.

5. The portable radio of claim 3 wherein said plastic material having a metallized mesh comprises a thin sheet of mylar material having gold deposited over the mylar material.

6. The portable radio of claim 2 wherein said metal screen comprises said high conductivity metallic material being photochemically etched away to form trapezoidal apertures in the metallic material to result in a single solid piece of mesh to provide improved conductivity for reducing electromagnetic emissions of said microprocessor from radiating through the display and re-radiating back into the radio to interfere with normal radio operation.

7. A portable radio having an electromagnetic shielded display, comprising:
    a liquid crystal display for the portable radio;
    a printed circuit board having a microprocessor and a plurality of contacts for the liquid crystal display;
    a radio front assembly having a transparent cover over said liquid crystal display;
    a thin electromagnetic shield comprising a mesh of high conductivity metallic material positioned between said cover and said liquid crystal display for protecting the radio against electromagnetic interferences from the microprocessor,
said mesh comprising an apertured sheet of the high conductivity metallic material having a plurality of apertures surrounded by a conductive border to provide improved conductivity for reducing electromagnetic emissions of said microprocessor from radiating through the display and re-radiating back into the radio to interfere with normal radio operation; and
    a bezel positioned between said electromagnetic shield and said radio front assembly for contacting the conductive border of the electromagnetic shield to properly ground both the electromagnetic shield and the radio front assembly, around said transparent cover.

* * * * *